United States Patent [19]
Grimm et al.

[11] Patent Number: 5,051,882
[45] Date of Patent: * Sep. 24, 1991

[54] THREE RESERVOIR CAPACITOR CHARGE PUMP CIRCUIT

[75] Inventors: Michael A. Grimm, Boulder Creek; Paul Hildebrant, San Jose, both of Calif.

[73] Assignee: Teledyne Industries, Mountain View, Calif.

[*] Notice: The portion of the term of this patent subsequent to Dec. 19, 2006 has been disclaimed.

[21] Appl. No.: 394,223

[22] Filed: Aug. 15, 1989

Related U.S. Application Data

[63] Continuation of Ser. No. 302,429, Jan. 27, 1989, Pat. No. 4,888,677.

[51] Int. Cl.$^5$ .............................. H02M 7/25
[52] U.S. Cl. ........................ 363/60; 307/110
[58] Field of Search ................ 363/59, 60, 61; 307/109, 110; 320/1

[56] References Cited

U.S. PATENT DOCUMENTS

| | | |
|---|---|---|
| 3,790,812 | 2/1974 | Fry .......................... 307/110 |
| 3,955,353 | 5/1976 | Astle ........................ 363/60 |
| 4,068,295 | 1/1978 | Portmann ................. 363/60 |
| 4,106,086 | 8/1978 | Holbrook et al. ........ 363/60 |
| 4,636,930 | 1/1987 | Bingham et al. ......... 363/60 |
| 4,777,577 | 10/1988 | Bingham et al. ....... 307/110 |
| 4,797,899 | 1/1989 | Fuller et al. ............. 363/60 |
| 4,888,677 | 12/1989 | Grimm et al. ........... 363/60 |

FOREIGN PATENT DOCUMENTS

0078364  5/1982  Japan ........................ 363/60

Primary Examiner—Peter S. Wong
Attorney, Agent, or Firm—Fliesler, Dubb, Meyer & Lovejoy

[57] ABSTRACT

A charge pump circuit operates from a voltage provided on an input rail at a first potential relative to a reference potential rail and that provides second and third potentials relative to the reference potential rail on first and second output rails, respectively. The charge pump circuit includes first, second and third charge reservoir capacitors, an oscillator and control logic circuit for providing timing control signals, and a switch network responsive to the timing control signals for coupling the first, second and third capacitors in a plurality of configurations. In transitioning between these configurations, the switch network provides for the decoupling of the first capacitor from between the input rail and the reference potential rail prior to enabling the second configuration and from between the second output rail and the input rail prior to enabling the first configuration, and for the decoupling of the second capacitor from between the first output rail and the reference potential rail prior to enabling the third configuration and from between the reference potential rail and the second output rail prior to enabling the first configuration.

22 Claims, 5 Drawing Sheets

FIG.-7 though, et al, U.S. Pat. No. 4,636,930, issued Jan. 13, 1987
THREE RESERVOIR CAPACITOR CHARGE PUMP CIRCUIT This is a continuation application of co-pending application Ser. No. 07/302,429, filed Jan. 27, 1989 now U.S. Pat. No. 4,888,677.

FIELD OF THE INVENTION

The present invention generally relates to charge pump circuits used to generate a voltage potential difference greater than the otherwise available supply rail potential and, in particular, to a charge pump circuit appropriate for monolithic fabrication with RS-232 type transceiver circuits and capable of providing split voltage potentials suitable for powering the operation thereof.

BACKGROUND OF THE INVENTION

Conventional computing equipment typically utilize RS-232 type transceiver circuits for the communication of data. Conventional RS-232 data transceivers operate from ±12 volt power supply rails and function to bidirectionally convert data between the standard digital logic signal (0–5 volts) representation and logically equivalent transmission voltage levels (±12 volts). The ordinary digital logic levels exist only within the electromagnetic interference (EMI) controlled area of the computer equipment enclosure. The relatively much greater RS-232 transmission voltage levels are used to transfer data through less EMI protected data cables that are often of substantial length. Such cables are therefore further subject to signal attenuation. The use of higher transmission voltage levels, however, allows a relatively large signal-to-noise ratio to be maintained even in the presence of significant signal attenuation.

In response to the continuing pressure to reduce the size, board level complexity and cost of computer equipment, a single integrated circuit embodying a pair of conventional RS-232 data transceivers and a charge pump circuit for generating the required ±12 volt power from a single 5 volt input power source has been developed. For example, the device disclosed in Bingham, et al, U.S. Pat. No. 4,636,930, issued Jan. 13, 1987 and entitled "Integrated Dual Charge Pump Power Supply and RS-232 Transmitter/Receiver", illustrates a L workable approach to providing a single chip RS-232 transceiver. The circuit disclosed utilizes four discrete charge reservoir capacitors, linked by an integrated charge pump switch network to provide the necessary ±12 volts required by co-integrated RS-232 transceiver circuits. Two reservoir capacitors are used alternatingly to accumulate and transfer charge. The remaining two reservoir capacitors are utilized to receive charge from the transfer reservoir capacitors and to support the current transfer requirements of the respective ±12 volt supply lines between charge transfers.

Although the Bingham, et al charge pump circuit provides an adequate solution and is suitable for monolithic integration, the circuit has two distinct disadvantages. The first disadvantage is that it requires four discrete charge reservoir capacitors of substantial size. Each charge reservoir capacitor is typically on the order of 100 microfarads. Capacitors of such size directly increase the amount of printed circuit board surface area and enclosure volume required to implement a complete RS-232 transceiver circuit.

The second and perhaps more significant disadvantage is that the monolithic fabrication of the Bingham, et al circuit requires several significant, if not critical, specialized process dependant integrated features to prevent incorrect operation of the circuit due to the occurrence of parasitic transistors. The operation of the switching network in effectively switching the charge reservoir capacitors between circuit nodes results in impulse currents of sufficient magnitude to initiate the operation of even weakly parasitic transistors. Consequently, the design of the Bingham, et al circuit requires several clamping structures to be implemented to block potential parasitic current paths. The implementation of current clamps require additional processing steps, with an increase in the complexity of fabrication, in order to ensure proper operation.

SUMMARY OF THE INVENTION

A general purpose of the present invention is to realize a charge pump circuit optimally suited for fabrication with RS-232 transceiver circuits and the like on a monolithic substrate.

This is achieved in the present invention by the provision of a charge pump circuit operating from a voltage provided on an input rail at a first potential relative to a reference potential rail and that provides second and third potentials relative to the reference potential rail on first and second output rails, respectively. The charge pump circuit includes first, second and third charge reservoir capacitors, an oscillator and control logic circuit for providing timing control signals, and a switch network responsive to the timing control signals for coupling the first, second and third capacitors in a plurality of configurations. A first configuration occurs wherein the first capacitor is coupled between the input rail and the reference potential rail, the second capacitor is coupled between the first output rail and the reference potential rail, and the third capacitor is coupled between the reference potential rail and the second output rail. A second configuration is achieved wherein the first capacitor is coupled between the first output rail and the input rail, the second capacitor is coupled between the first output rail and the reference potential rail, and the third capacitor is coupled between the reference potential rail and the second output rail. A third configuration is achieved upon coupling of the first capacitor between the first output rail and the input rail. The second capacitor is coupled between the reference potential rail and the second output rail, and the third capacitor is coupled between the reference potential rail and the second output rail. In transitioning between these configurations, the switch network provides for the decoupling of the first capacitor from between the input rail and the reference potential rail prior to enabling the second configuration and from between the first output rail and the input rail prior to enabling the first configuration, and for the decoupling of the second capacitor from between the first output rail and the reference potential rail prior to enabling the third configuration and from between the reference potential rail and the second output rail prior to enabling the first configuration.

Thus, an advantage of the present invention is that it provides a charge pump circuit for generating two voltages of opposite polarity and symmetric potential relative to a reference potential with magnitudes approximately twice that of the single input voltage potential.

This is achieved in the present invention while requiring only three charge reservoir capacitors.

Another advantage of the present invention is that it is compatible with epitaxial integrated circuit fabrication processes, thereby essentially eliminating the occurrence of on-chip parasitics that would interfere with the operation of the present invention.

A further advantage of the present invention is that it is capable of providing its output voltage potentials with adequately low output ripple and at sufficient continuous current draw levels as to fully support a full function RS-232 type transceiver circuit.

BRIEF DESCRIPTION OF THE DRAWINGS

These and other attendant advantages and features of the present invention will become readily appreciated upon consideration of the following detailed description of the invention when considered in conjunction with the accompanying drawings, wherein like reference numerals designate like parts throughout the figures thereof, and wherein:

FIG. 4c is a schematic diagram of the level shifting and timing control circuitry of a preferred embodiment of the present invention corresponding to the second stage circuit shown in FIG. 4a;

DETAILED DESCRIPTION OF THE INVENTION

Figure 1:
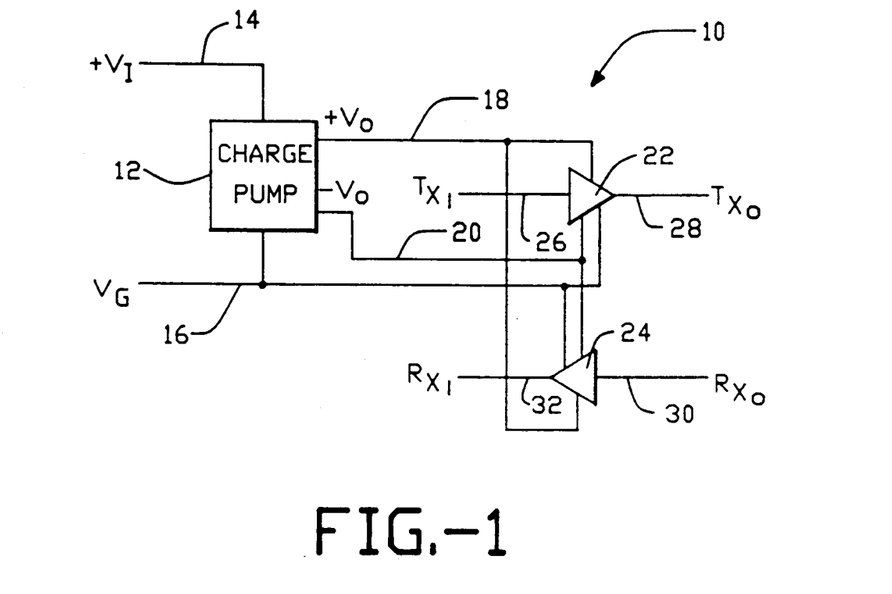
FIG. 1 is a simplified schematic diagram of an RS-232 type transceiver pair powered from a single voltage level input charge pump circuit.

A simplified schematic diagram of an RS-232 type transceiver pair operating from the output voltages provided from a charge pump circuit that, in turn, operates from a single low voltage (typically 5 volt) input source, as generally indicated by the reference numeral 10, is shown in FIG. 1. The circuit 10 includes a charge pump subcircuit 12 operating from an input voltage rail 14 provided with an input voltage $+V_I$ and a ground reference rail 16 at a reference voltage potential $V_G$. The charge pump subcircuit 12 operates to provide two output voltages, $+V_O$ and $-V_O$, having a potential difference of approximately $4+V_I(\pm 2+V_I)$ about the reference potential $V_G$. The positive output voltage $+V_O$ is provided on the internal output rail 18 to both the transmitter 22 and receiver 24 subcircuits. The negative potential $-V_O$ similarly provided on a separate internal output rail 20 to the transmitter and receiver 22, 24.

The transmitter 22 receives an input logic signal $Tx_i$ on an externally connected input line 26. The function of the transmitter 22, conventionally, is to level shift the input TTL compatible logic level present on the input line 26 to a unipolar voltage potential $Tx_o$ that correspondingly varies between $\pm 12$ volt levels on the transmitter output line 28.

The receiver 24 performs a complementary function. An externally provided input signal, $Rx_o$, that varies between $\pm 12$ volt levels is buffered to TTL compatible voltage levels and provided as $Rx_i$ on the receiver output line 32.

Figure 2:
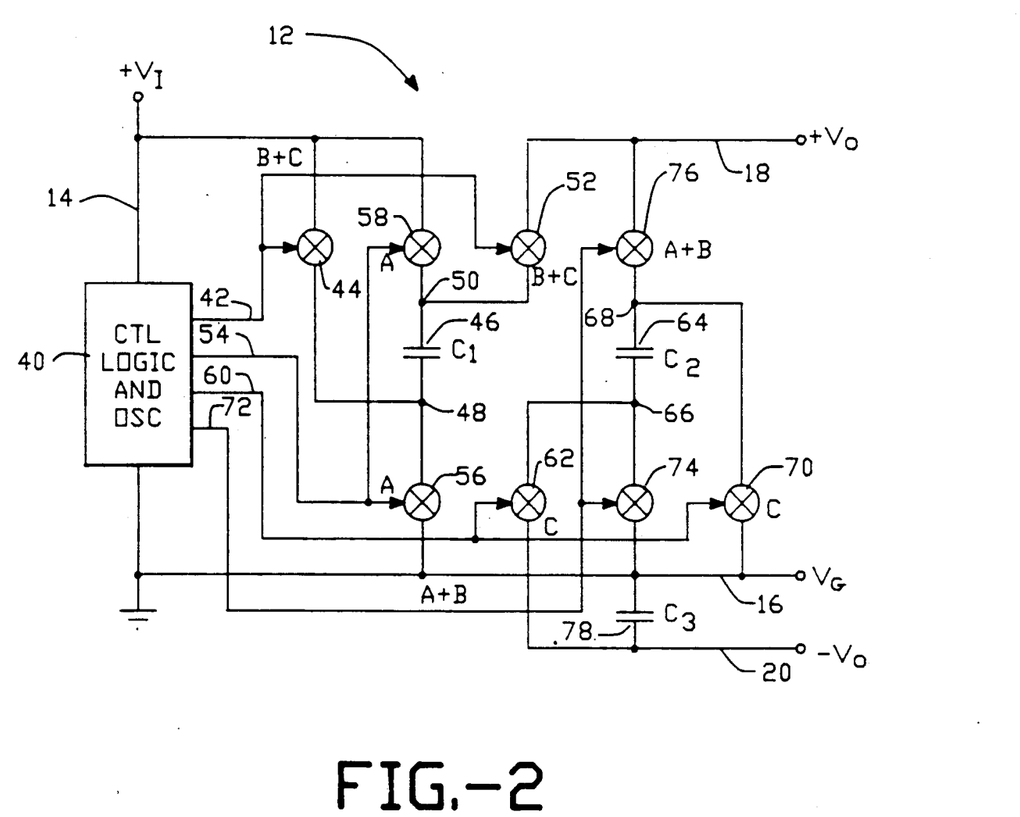
FIG. 2 is a simplified schematic diagram of a three-charge reservoir capacitor charge pump circuit constructed in accordance with a preferred embodiment of the present invention.

A simplified schematic diagram of the preferred charge pump subcircuit 12 of FIG. 1 is shown in FIG. 2. A network of switches 44, 52, 56, 58, 62, 70, 74, 76 are provided to variously interconnect charge reservoir capacitors $C_1$ 46, $C_2$ 64 and $C_3$ 78 to provide the output voltages $+V_O$ and $-V_O$ on the output rails 18, 20. A control logic and oscillator block 40 provides the timing signals necessary to control the operation of the switch network. The block 40 produces a first control signal, denoted as "B+C", on control line 42 to control the operation of switches 44 and 52. Switch 44 in turn, controls coupling terminal 48 of capacitor 46 to the input voltage rail 14. Switch 52 controls the coupling of the second terminal 50 of the capacitor 46 to the $+V_O$ output rail 18.

A second control signal, denoted as "A", is provided on control line 54 to switches 56 and 58. Switch 56 controls the coupling of the first terminal 48 of the capacitor 46 to the ground reference rail 16. Switch 58 controls the coupling of the second terminal 50 of the capacitor 46 to the input rail 14.

A third control signal, denoted as "C", is provided on a control line 60 to switches 62 and 70. Switch 62 controls the coupling of a first terminal 66 of the capacitor $C_2$ 64 to the $-V_O$ output rail 20. Switch 70 controls the coupling of a second terminal 68 of the capacitor $C_2$ 64 to the ground reference rail 16.

Finally, a fourth control signal, denoted as "A+B", is provided to the remaining switches 74, 76. Switch 74 controls the coupling of the first terminal 66 of the capacitor $C_2$ 64 to the ground reference rail 16. The switch 76 controls the coupling of the second terminal 68 of the capacitor $C_2$ 64 to the $+V_O$ output rail 18.

Figure 3:
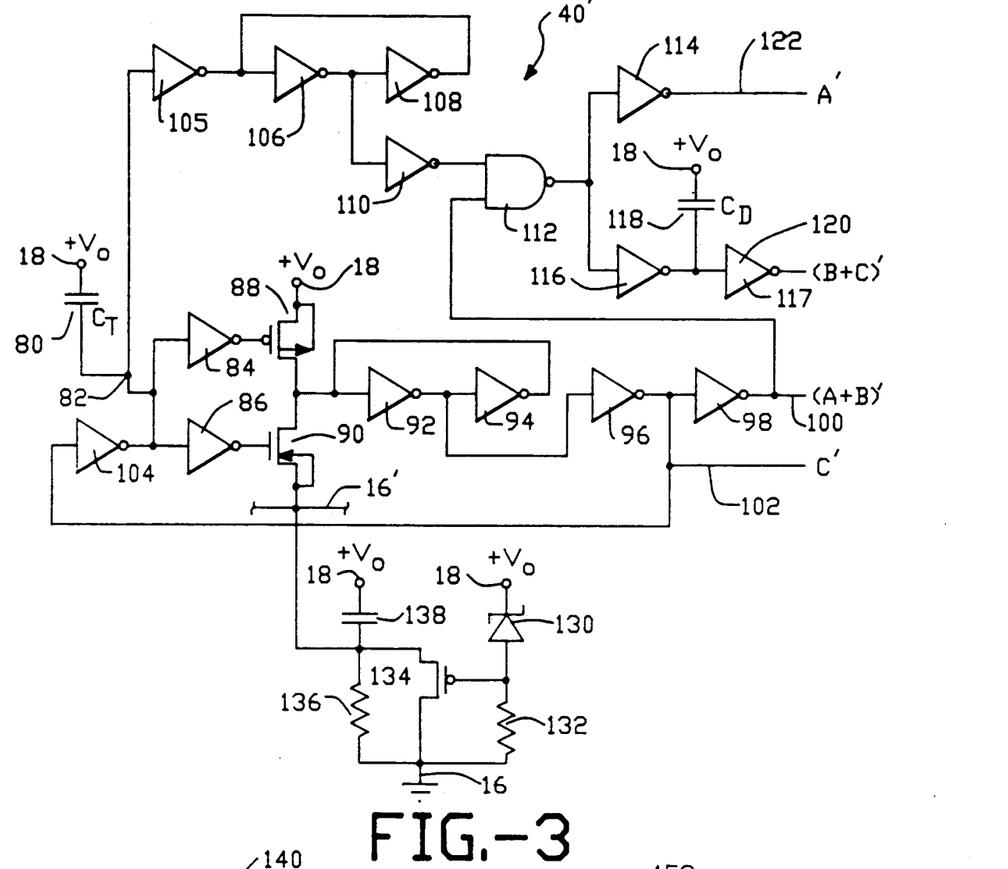
FIG. 3 is a detailed schematic diagram of an oscillator and first stage timing control signal generation circuit for controlling the switch network of the present invention.

The circuit schematic of the control logic and oscillator block 40 is shown in greater detail in FIGS. 3 and 4. Referring first to FIG. 3, the circuit schematic for the oscillator and initial timing control logic 40' is shown. A timing capacitor $C_T$ 80 is coupled between the output rail 18 and a node 82. Inverters 84 and 86, whose inputs are commonly connected at node 82, drive the respective gates of series connected P- and N- type transistors 88, 90 to switch the input to an inverter 92, coupled to the common connection point between the FETs 88, 90 that are, in turn, connected between the $+V_O$ output rail potential and a buffered ground potential provided at a virtual ground reference rail 16'. The input and output of an inverter 94 are respectively coupled to the output and input of the inverter 92 to provide a latch function for the input of the inverter 92. The output of the inverter 92 is further coupled to the input of an inverter 96 whose output provides a timing control signal C' on control line 102. The signal is also fed back to the input of an inverter 104 whose output is coupled to the node 82. Another timing control signal, (A+B)', is provided on a control line 100 from the output of an inverter 98 whose input is the control line 102.

As should be readily apparent, the delay contributed by the inverters 84, 86, 92, 96 and 104, combined with the voltage slew imposed by the timing capacitor $C_T$ at the node 82, further combined with the complimentary switching operation of the FETs 88 and 90, results in the creation of a free running oscillator. The period of this oscillator may be directly controlled by the value selected for the timing capacitor $C_T$ 80, the unit logic delay of the inverters 84, 86, 92, 96 and 104 and selection of the independent input thresholds of the inverters 84 and 86. For the latter, the duty cycle is adjusted by adjusting the ratio of the slew current provided by inverter 104 at its output in the pull-up mode (output going high) as compared to the pull-down mode (output going low). In the preferred embodiments of the present invention, the oscillator frequency is approximately 27 kHz with a duty cycle of 66.67%.

Another factor affecting both the period and duty cycle of the oscillator is the voltage potential provided at the virtual ground reference rail 16'. The control logic and oscillator block 40 must be isolated from supply voltage transients in order to ensure continued steady operation. While the block 40 might be powered from the relatively stable input voltage potential $+V_I$, as generally shown in FIG. 2, the preferred embodiments of the present invention use P-type FETs in the block 40 in addition to N-type FETs. The channel of the P-type FETs are preferably coupled through the N+ type substrate of the preferred embodiments to the highest potential, i.e., $+V_O$, in order to minimize body effect. If the block 40 is powered by the positive output potential $+V_O$, rather than $+V_I$, an unnecessary power dissipation problem and a requirement for higher-voltage tolerant P-type FETs can be avoided. Consequently, the block 40 is preferably operated from the $+V_O$ potential on the positive output rail 18 and a constant $+V_O-5V$ potential provided on the virtual ground reference rail 16', i.e., the same potential difference represented by $+V_I$.

The potential at the virtual ground reference rail 16' is controlled largely by the reverse biased threshold of a Zener diode 130 series connected between the positive output potential $+V_O$ and through a resistor 132 to the ground reference voltage potential rail 16. The gate terminal of a P-type FET 134 is coupled to the common series connection between the Zener diode 130 and the resistor 132 to thereby establish a current path between the virtual ground node 16' and the ground voltage reference rail 16. A bypass capacitor 138 is coupled between the positive output potential $+V_O$ rail 18 and virtual ground rail 16', while a second resistor 136 is coupled between the virtual ground rail 16' and the ground voltage reference rail 16. Thus, the threshold voltage of the Zener diode 130, less the gate threshold potential of the FET 134, effectively establishes a high-frequency bypassed ground reference potential for the control logic and oscillator block 40' that tracks the positive output potential $+V_O$. The control logic and oscillator block 40' is therefore effectively isolated from transients on the input and ground reference rails 14, 16 and particularly, the output voltage rail 18. In the preferred embodiments of the present invention, the Zener diode is provided with a threshold of approximately 6.3 $V_Z$.

The input of a latch configured pair of inverters 106, 108 is also coupled through an inverter 105 to the node 82. The output of the latch 106, 108 is coupled as an input to an inverter 110 whose output is, in turn, connected to a first input of a NAND gate 112. The second input of the NAND gate 112 is connected to the control line 100.

The inputs of inverters 114 and 116 are commonly connected to the output of the NAND gate 112. The inverter 114 provides an A' control signal on the control line 122. The inverter 116 is coupled through a second inverter 117 to provide a (B+C)' control signal on the control line 120. A delay inducing capacitor $C_D$ is coupled at a point between the inverters 116, 117 and the output voltage rail 18.

Figure 4A:
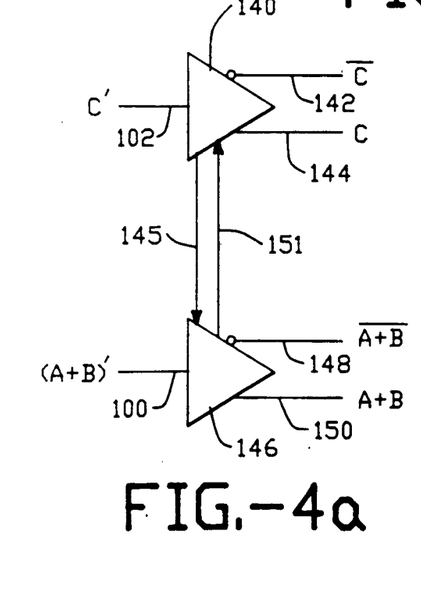
FIGS. 4a-b are simplified schematic diagrams of a second stage for generating timing control signals for controlling the switch network of the present invention.
Figure 4B:
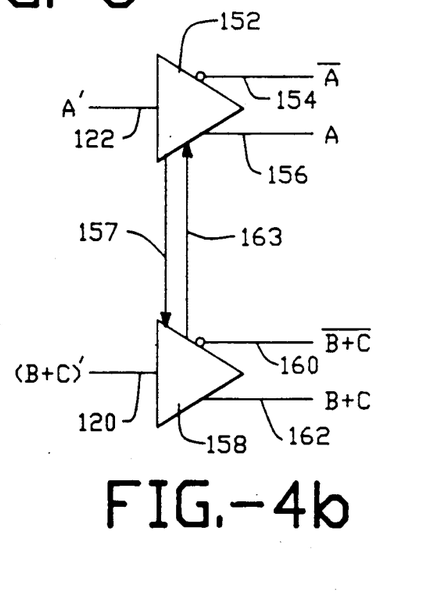

As illustrated in FIGS. 4a–b, the timing control signals C', (A+B)', A' and (A+B)' are provided to buffers 140, 146, 152 and 158, respectively. In turn, the buffers 140, 146 level shift and provide complimentary timing control signals $\overline{C}$ and C on timing control lines 142, 144, and $\overline{A+B}$ and A+B on timing control lines 148, 150; these signals being provided relative to the negative output $-V_O$ 20. Similarly timing control signals $\overline{A}$ and A are provided by the buffers 152, 158 on timing control lines 154, 156 and timing control signals $\overline{B+C}$ and B+C are provided on the timing control lines 160, 162; these signals also being provided relative to the negative $-V_O$ 20. However, as shown in FIG. 4a, an enable signal provided from buffer 140 on control line 145 determines, at least in part, when the state of the $\overline{A+B}$ and A+B timing control signals can change in response to a change in the (A+B)' signal. The enable signal on control line 145 is provided when the timing control signal C' is provided active low. Until the buffer 146 receives the enable signal on control line 145, the state of the $\overline{A+B}$ and A+B timing control signals are prevented from changing in response to a rising edge in the (A+B)' signal.

Similarly, an enable signal is provided from the buffer 146 on control line 151 to determine, at least in part, when the state of the $\overline{C}$ and C may change in response to a change in the C' timing control signal. That is, once buffer 146 has been enabled, allowing the $\overline{A+B}$ and A+B timing control signals to transition with A+B inactive, or low, the buffer 140 is enabled by provision of the enable signal on the enable control line 151 to permit the transition of the $\overline{C}$ and C timing control signals on control lines 142, 144 in response to a rising edge in the C' timing control signal.

As shown in FIG. 4b, an enable control signal, provided on the enable control line 157 from the buffer 152 following the A' timing control signal going active low, is used to enable the buffer 158. An enable control signal is provided by the buffer 158 to the buffer 152 in response to a transition by the (B+C)' timing control signal to its active low state.

Figure 4C:
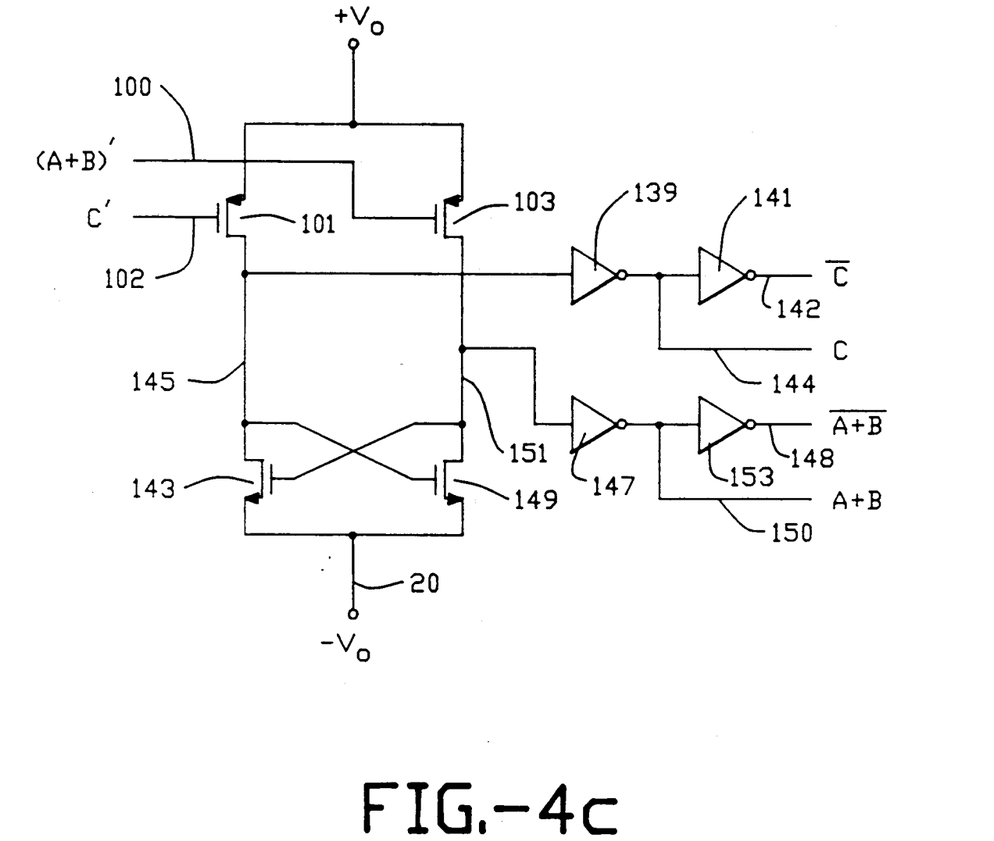

FIG. 4c details the circuitry of the buffer pair 140, 146. The circuitry of the buffer pair 152, 158 is essentially identical. An initial, level shifting stage receives the timing control signals C' and (A+B)' at the gates of P-type FETs 101, 103 that are respectively coupled from the output potential $+V_O$ rail 18 to the enable control lines 145, 151. A latch, formed by FETs 143 and 149 coupled from the respective enable control lines 145, 151 to the negative output rail $-V_O$ 20, complete the input stage. The outputs of the level shifting stage are the enable control lines 145, 151. The level shifter is designed such that if both inputs, (A+B)' and C', are low, both outputs will be high. When both inputs, (A+B)' and C', are high, the P-type FETs 101, 103 are off and the N-type FETs 143, 149 latch the previous state of the (A+B)' and C' timing control signals. For all other states of the inputs, (A+B)' and C', the level shifting stage merely repeats its inputs at its outputs.

The outputs, 145, 151, of the level shifting stage are respectively provided to series coupled inverter pairs 139, 141 and 147, 153. These inverters, in turn, provide the $\overline{C}$, C, $\overline{A+B}$ and A+B timing control signals on the timing control lines 142, 144, 148, and 150.

Figure 5:
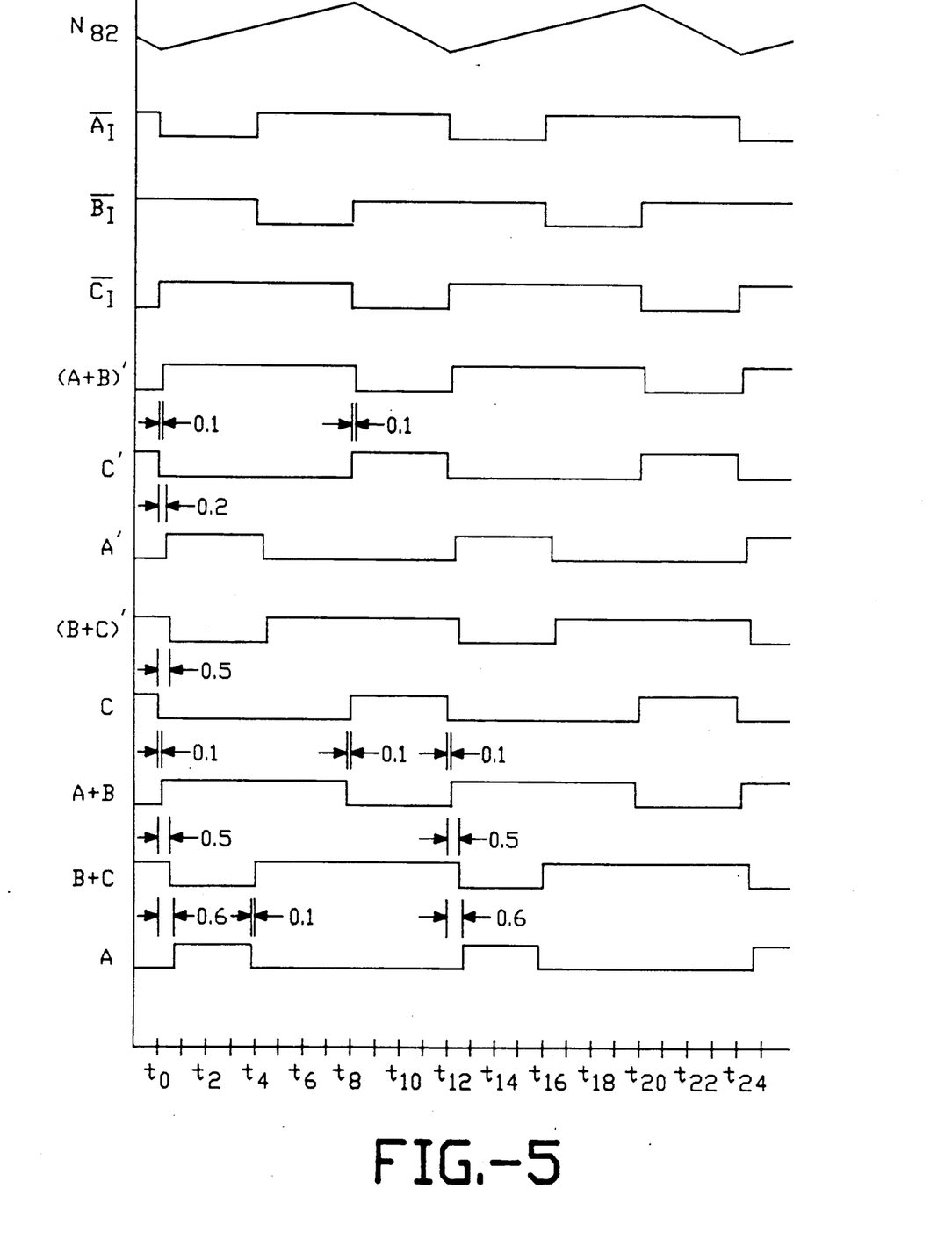
FIG. 5 illustrates the waveforms of the timing control signals utilized in a preferred embodiment of the present invention to control the switch network of a preferred embodiment of the present invention.

Referring now to FIG. 5, the timing waveforms associated with the operation of the preferred embodiment of the present invention are shown. The waveform $N_{82}$ illustrates the change of voltage potential at node 82 of FIG. 3. For an oscillator cycle period beginning at $t_0$ and ending at $t_{12}$, the $N_{82}$ waveform rises, in the preferred embodiment of the present invention, for two thirds of the cycle before declining to the original voltage level during the balance of the cycle. The $N_{82}$ waveform effectively reflects the ideal three-phase waveforms, shown as $\overline{A_I B_I}$ and $\overline{C_I}$ that define the basic three-phase operation of the present invention. However, the ideal waveforms $\overline{A_I B_I}$ and $\overline{C_I}$ are not actually generated in the operation of the present invention. Rather, the intermediate timing control wave forms (A+B)', C', A' and (B+C)' are produced directly by the operation of the control logic and oscillator block 40' of FIG. 3 based on the $N_{82}$ waveform. These intermediate timing control signals (A+B)', C', A' are then combined and used to produce the final timing and control signals C, A+B, B+C and A. Considering the single cycle between $t_0$ and $t_{12}$ as representative of all operational cycles of the present invention, the three operational phases are generally defined as occurring between $t_0$ and $t_4$ (Phase 1), $t_4$ and $t_8$ (Phase 2), and $t_8$ and $t_{12}$ (Phase 3). During the first phase of operations, for example at $t_2$, timing control signals A+B and A are active on while timing control signals C and B+C are inactive, or off. Consequently, switches 44 and 52 of FIG. 2 are effectively open, switches 56 and 58 are closed, switches 62, 70 are open and switches 74, 76 are closed. In this Phase 1 circuit configuration, capacitor $C_1$ 46 is charged from the input voltage rail 14 while capacitor $C_2$ 64 and $C_3$ 78 support the $+V_O$ and $-V_O$ output voltage potentials on the respective output rails 18, 20.

During Phase 2, for example at $T_6$, timing control signal B+C is active while timing control signal A is inactive. Thus, terminal 48 of capacitor $C_1$ 46 has been decoupled by switch 56 from the ground reference rail 16 and coupled through switch 44 to the input rail 14. Similarly, terminal 50 of capacitor $C_1$ 46 has been decoupled from the input rail 14 by switch 58 and coupled to the positive output rail 18 by switch 52. Consequently, charge is transferred from capacitor $C_1$ 46 to capacitor $C_2$ 64 while boosting the voltage potential on the output rail 18 to approximately twice the input rail potential $+V_I$.

Finally, in the third phase of operation, for example at $t_{10}$, the timing control signal C is active while the timing control signal A+B is inactive. Thus, the terminals 68, 66 of capacitor $C_2$ 64 are respectively decoupled by the action of the switches 74, 76 from between the positive output rail 18 and the ground reference rail 16 and coupled, by switches 70, 62, respectively, to the ground reference rail 16 and negative output potential rail 20. Consequently, charge stored by the capacitor $C_2$ 64 is transferred to capacitors $C_3$ when the voltage potential across the capacitor $C_2$ 64 is applied across the capacitor $C_3$. After a number of cycles of operation, the magnitude of voltage potential difference across $C_3$ will stabilize at approximately twice that of the input rail potential $+V_I$. During this Phase 3, the capacitor $C_1$ 46 acts to support the positive output rail potential, $+V_O$ on output rail 18.

In order to conserve the charge stored by the capacitors $C_1$, $C_2$ and $C_3$ and to minimize output voltage and current spiking, the mutual transitions of the timing control signals C, A+B, B+C and A, are critical. At the conclusion of Phase 1, at about $t_4$, terminals 48, 50 of capacitor $C_1$ must be decoupled in response to timing control signal A from the ground reference and input voltage rails 16, 14, respectively. This decoupling must occur prior to being connected to the input voltage and positive output voltage rails 14, 18, respectively in response to the B+C timing control signal. As should be apparent, failure to do so would result in the direct shorting of capacitor $C_1$ 46. Therefore, timing control signals B+C and A must not have overlapping active states.

Similarly, the terminals 48, 50 of capacitor $C_1$ 46 must be decoupled from the input and positive output rails 14, 18 prior to being recoupled to the ground reference rail 16 and positive voltage input rail 14. This non-overlap condition is effectively controlled by the provision of the delay capacitor CD coupled to the input of inverter 117 and the enablement of buffer 158 in response to the provision of the A' timing control signal. The transition of the timing control signal B+C is delayed from $t_0$ by approximately 0.5 microseconds in the preferred embodiment of the present invention. Since the buffer 152 of FIG. 4b is enabled only when the timing control signal (B+C)' is low, the timing control signal A is not provided on the control line 156 until approximately 0.6 microseconds after $t_0$.

The timing control signals A+B and C must likewise have non-overlapping active high states in order to prevent shorting during the transitions between Phases 2 and 3 at $t_8$ and between Phases 3 and 1, at $t_{12}$. That is, the terminals 66, 68 of capacitor $C_2$ 64 must be decoupled by switches 74, 76 from the ground reference and positive output voltage rails 16, 18 prior to being coupled to the negative voltage output and ground reference rails 20, 16 by operation of the switches 62, 70. Due to the presence of the inverter 98, in the control logic and oscillator block 40' as shown in FIG. 3, the (A+B)' timing control signal transitions will closely lag those of the timing control signal C'. However, the rising edge of the timing control signal C is forced to trail the falling edge of the timing control signal A+B by use of the A+B timing control signal to enable the operation of buffer 140 to provide the C timing control signal on control line 144.

Finally, it is highly preferred, if not critical, for the active high states of the A+B and B+C timing control signals to overlap during the transition from phase 3 to phase 1. This condition is desired to insure that the positive output voltage potential rail 18 is supported at all times by a reservoir capacitor. This condition is effectively achieved in the present invention by selection of the timing delay capacitor's $C_D$ value such that transitions of the timing control signal (B+C)' follow those of the timing control signal (A+B)' by a margin of at least 0.2 micro seconds and, in the preferred embodiment of the present invention, by approximately 0.4 microseconds.

Figure 6:
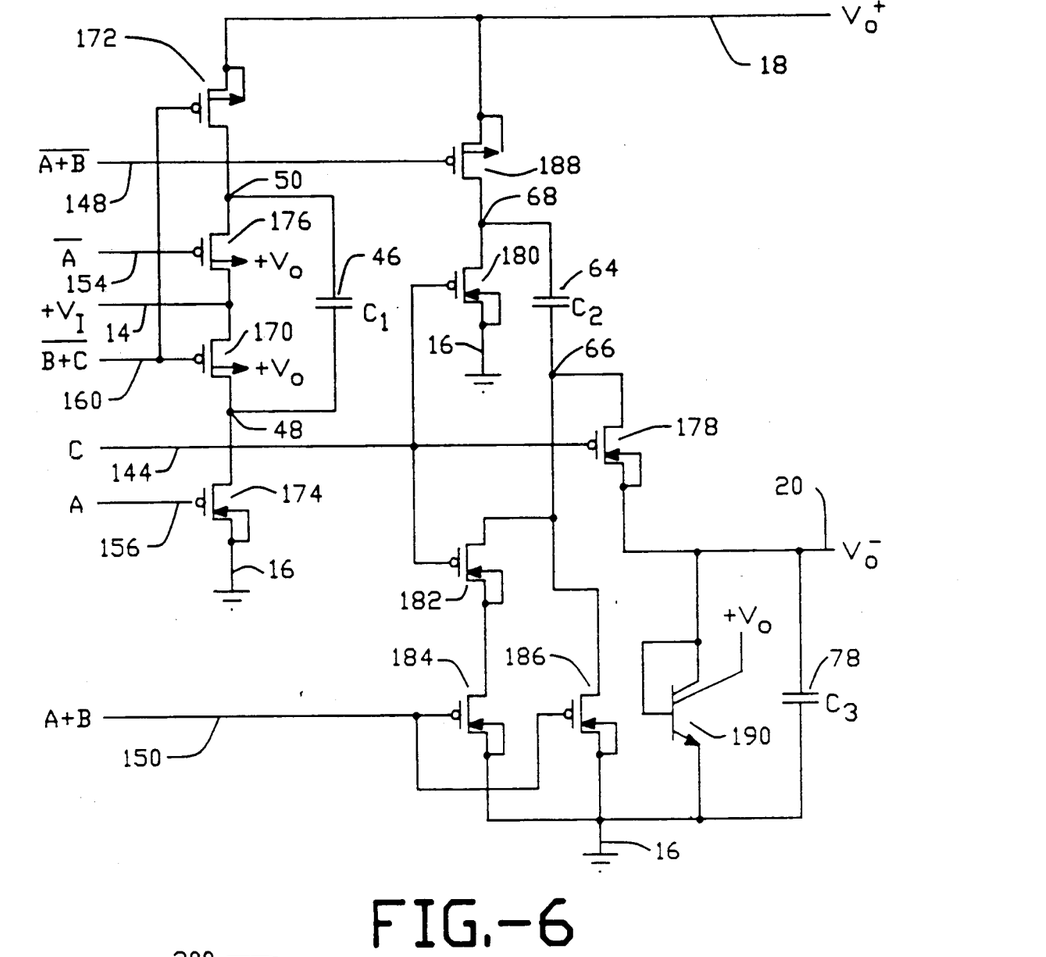
FIG. 6 is a detailed circuit schematic of the charge pump switch network utilized in a preferred embodiment of the present invention.

A detailed schematic diagram of the preferred charge reservoir capacitor switching network of the present invention is shown in FIG. 6. N-type FET 174 and P-type FET 176 act as simple switches to permit the coupling of the terminals 48, 50 of the charge reservoir capacitor $C_1$ 46 to the ground reference and positive input rails 16, 14 respectively, in response to the application of the A and $\overline{A}$ timing control signals to their FET gate electrodes via control lines 156, 154.

Similarly, P-type FETs 170 and 172 enable the coupling of the terminals 48, 50 of the capacitor $C_1$ 46 to the input voltage and positive output supply rails 14, 18 in response to the $\overline{B+C}$ timing control signal provided to their FET gates via control line 160.

The $\overline{A+B}$ timing control signal, provided via control line 148 to the gate of P-type FET 188 allows terminal 68 of the reservoir capacitor $C_2$ 64 to be coupled to the positive output supply rail 18. The terminal 68 is also alternately coupled through N-type FET 180 to the ground reference rail 16 in response to the C timing control signal as provided on control line 144. The C timing control signal also controls N-type FET 178 in coupling terminal 66 of the capacitor $C_2$ to the negative output supply rail 20.

N-type FET 186, controlled by the A+B timing control signal, provides a current path from terminal 66 of capacitor $C_2$ 64 to the ground reference rail 16. Two additional FETs 182, 184, respectively controlled by the C and A+B timing control signals, are also serially coupled between terminal 66 and the ground reference rail 16. The source and drain of FETs 182, 184 are further coupled to the body of FET 186. Consequently, the body effect associated with FET 186 is substantially reduced, ensuring that FET 186 switches quickly in response to the A+B timing control signal.

Finally, one collector and the emitter of a diode connected multiple collector transistor 190 are respectively connected to the negative supply reference rail 20 and ground reference rail 16. The output potential $+V_O$ is provided to a second collector of the transistor 190 to ensure operation as an unidirectional, fast acting current shunt. Thus, the transistor 190 operates to clamp positive voltage transients that may appear on the negative output supply rail 20 to voltages less than approximately +0.6 volts particularly during start-up operation.

In accordance with the preferred embodiments of the present invention, no further design enhancements need be provided to ensure proper operation of the present invention. This is made possible by the preferred use of an epitaxial fabrication process that inherently provides for a high degree of isolation between neighboring FET transistors.

Figure 7:
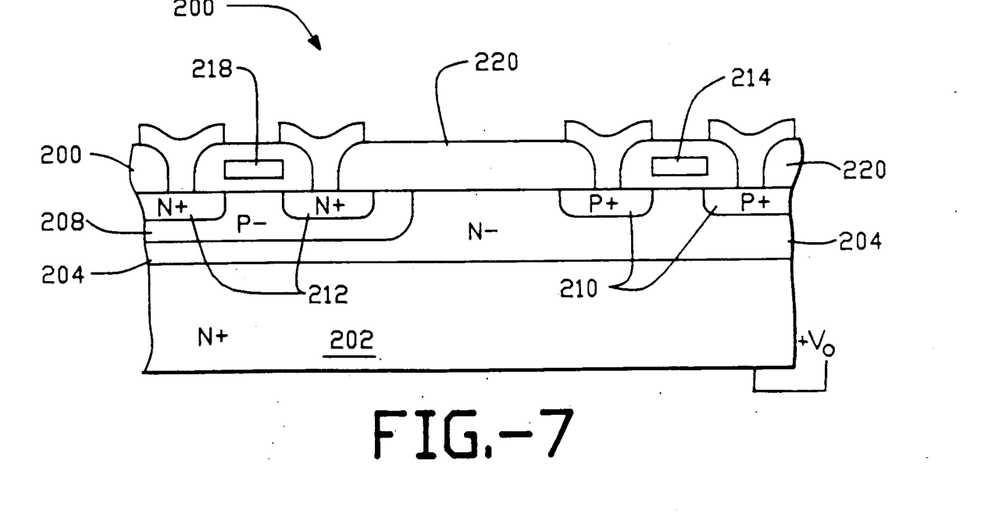
FIG. 7 is a cross-sectional diagram of a portion of the circuit of the present invention illustrating the preferred epitaxial fabrication of the transistors thereof.

For purposes of completeness, a cross-section 200 of two neighboring switch FET transistors of the present invention are shown in FIG. 7. As typical of conventional epitaxial fabrication processes, an $N^-$ epitaxial layer 204 is provided on the surface of an $N^+$ type substrate 202. For example, a P-type FET transistor is formed by the provision of $P^+$ source and drain regions 210 formed in the epitaxial layer 204 and a gate electrode 214. An N-type FET transistor is formed by the provision of $N+$ source and drain regions 212 in a P-well 208 also formed in the epitaxial layer 204. The N-type FET is completed with the provision of its gate electrode 218. As is conventional, the gates 214, 218 of the P-type and N-type FET transistors are formed within the overlying oxide layer generally indicated as layer 220. The N- and P-type transistors are thus present within respective portions of the N-epitaxial layer 204 effectively isolated by the existence of a low impedance path through the N+ substrate to the $+V_O$ potential.

Thus, a three phase charge pump circuit requiring no more than three charge reservoir capacitors and that is suitable for fabrication on a common monolithic substrate with RS-232 type transceiver circuits has been described.

From the forgoing disclosure of the preferred embodiments of the present invention, numerous modifications and variations should be readily apparent to those of skill-in-the-art to which the present invention pertains. Accordingly, it is therefore to be understood that, within the scope of the appended claims, the present invention may be practiced otherwise than as specifically described above.

We claim:

1. A switched capacitor network for producing a plurality of output potentials from an input potential, said network comprising:
   a) switching means, responsive to a control signal, for conductively interconnecting a plurality of charge reservoir nodes, an input node, a reference node and first and second output nodes in a plurality of charge transfer configurations including:
      a first configuration wherein a first charge reservoir node is connected to said input node and a second charge reservoir node is connected to said reference node, whereby a first charge reservoir capacitor connectable between said first and second charge reservoir nodes accumulates charge from said input node;
      a second configuration wherein said second charge reservoir node is connected to said input node and said first charge reservoir node is connected to said first output node and a third charge reservoir node is connected to said first output node and a fourth charge reservoir node is connected to said reference node, whereby said first charge reservoir capacitor transfers charge to a second charge reservoir capacitor connectable between said third and fourth charge reservoir nodes; and
      a third configuration wherein said third charge reservoir node is connected to said reference node and said fourth charge reservoir node is connected to said second output node and a fifth charge reservoir node is connected to said second output node and a sixth charge reservoir node is connected to said reference node, whereby said second charge reservoir capacitor transfers charge to a third charge reservoir capacitor connectable between said fifth and sixth charge reservoir nodes; and
   b) control means for controlling said switching means by providing said control signal to select said first, second or third configuration.

2. The switched capacitor network of claim 1 wherein said control means selects said first, second and third configurations in a repeating series.

3. The switched capacitor network of claim 2 including said first, second and third charge reservoir capacitors, wherein first and second complementary polarity voltage potentials are maintained at said first and second output nodes by the provision of charge therethrough, and wherein said first, second and third charge reservoir capacitors are each of sufficient capacitance to maintain such provision of charge for approximately two-thirds of the period of said repeating series.

4. The switched capacitor network of claim 3 wherein only said first, second and third charge reservoir capacitors are required to be of sufficient capacitance to maintain the provision of charge for approximately two-thirds of the period of said repeating series.

5. A bipolar voltage generator, operating from a voltage source of a first polarity to provide first and second complementary polarity output voltages, said generator comprising:
   a) switching means, responsive to three phase switching control signals, for transferring charge received from an input terminal to first and second output terminals in a sequence of phases, said switching means, in a first phase, selectively connecting a first charge reservoir capacitor to said input terminal to receive charge, a second charge reservoir capacitor to said first output terminal to transfer charge in support of a first polarity output voltage, and a third charge reservoir capacitor to said second output terminal to transfer charge in support of a complementary second polarity output voltage, in a second phase, selectively connecting said first charge reservoir capacitor to said first output terminal to transfer charge to said second charge reservoir capacitor, and, in a third phase, selectively connecting said second charge reservoir capacitor to said second output terminal to transfer charge to said third charge reservoir capacitor; and
   b) control means for providing said three phase switching control signals to said switching means.

6. In a circuit for providing a plurality of output voltage potentials derived from an input voltage potential by use of a switching network for charging a transfer storage capacitor from the input voltage potential and transferring the charge to an output potential supporting storage capacitor, an improvement comprising:
   means for switching a first output potential supporting storage capacitor from supporting a first output potential to transfer charge to a second output potential supporting storage capacitor in support of a second output potential.

7. The improvement of claim 6 wherein said switching means exclusively charges said second output potential supporting storage capacitor from other output potential supporting storage capacitors.

8. The improvement of claim 6 or 7 wherein said switching means provides for the connection of said transfer storage capacitor to support said first output potential while said first output potential supporting storage capacitor is connected to transfer charge to said second output potential supporting storage capacitor.

9. The improvement of claim 8 wherein said switching means provides for the connection of said transfer storage capacitor to exclusively support said first output potential while said first output potential supporting storage capacitor is connected to transfer charge to said second output potential supporting storage capacitor.

10. The improvement of claim 9 wherein said switching means switches said transfer storage capacitor in series with the input voltage potential while charging said first output potential supporting storage capacitor and while supporting said first output potential.

11. The improvement of claim 10 wherein said switching means switches said first output potential supporting storage capacitor to charge said second output potential supporting storage capacitor to support said second output potential with a polarity opposite of that of said first output potential.

12. A method of providing a plurality of output voltage potentials from an input voltage potential, said method comprising the steps of:
   a) charging a first charge reservoir capacitor from an input voltage potential while a second charge reservoir capacitor supports a first output potential at a first output terminal and a third charge reservoir capacitor supports a second output potential at a second output terminal;
   b) switching said first charge reservoir capacitor to connect between said input voltage potential and said first output terminal;
   c) switching said second charge reservoir capacitor to connect to said second output terminal while said first charge reservoir capacitor supports said first output potential at said first output terminal; and
   d) repeating steps (a) through (c) periodically.

13. The method of claim 12 wherein said input voltage potential is provided relative to a reference voltage and wherein, in the step of switching said first charge reservoir capacitor, said second charge reservoir capacitor is further connected through to said reference voltage so as to be effectively connected in parallel with said first charge reservoir capacitor.

14. The method of claim 13 wherein, in the step of switching said second charge reservoir capacitor, said second charge reservoir capacitor is connected so as to be effectively connected in parallel with a third charge reservoir capacitor connected between said reference voltage and second output terminal.

15. An charge pump circuit provided as an element of an integrated circuit having a plurality of terminals, said charge pump circuit comprising:
   a) first means, responsive to a first control signal, for selectively coupling first and second capacitor connection terminals to an input terminal and a reference terminal, respectively;
   b) second means, responsive to a second control signal, for selectively coupling said first and second capacitor connection terminals to a first output terminal and said input terminal, respectively;
   c) third means, responsive to a third control signal, for selectively coupling third and fourth capacitor connection terminals to a first output terminal and said reference terminal, respectively;
   d) fourth means, responsive to a fourth control signal, for selectively coupling said third and fourth capacitor connection terminals to said reference terminal and a second output terminal, respectively;
   e) fifth means for coupling fifth and sixth capacitor connection terminals to said reference terminal and said second output terminal, respectively; and
   f) control means for providing said first through fourth control signals to said first through fourth means to provide for the transfer of charge from said input terminal to said first and second output terminals.

16. The charge pump circuit of claim 15 wherein said control means provides said first through fourth control signals to enable said first through fourth means, respectively, said control means providing said first through fourth control signals to select a series of circuit configurations whereby a potential for transferring charge is transferred from said input terminal to said first and second output terminals.

17. The charge pump circuit of claim 16 wherein a first circuit configuration is realized by the provision of said first and third control signals, wherein a second circuit configuration is realized by the provision of said second and third control signals, and wherein a third circuit configuration is realized by the provision of said second and fourth control signals.

18. The charge pump circuit of claim 17 wherein said first control signal is withdrawn prior to the provision of said second control signal, said third control signal is withdrawn prior to the provision of said fourth control signal, said second control signal is withdrawn prior to the provision of said first control signal, and said fourth control signal is withdrawn prior to the provision of said third control signal.

19. The charge pump circuit of claim 15 or 18 wherein said control means operates from the potential difference between said first output terminal and said reference terminal.

20. The charge pump circuit of claim 19 wherein said circuit is fabricated at the surface of a substrate and wherein the bulk of said substrate is conductively coupled to said first output terminal.

21. The charge pump circuit of claim 20 further comprising first, second and third charge reservoir capacitors coupled between said first and second, said third and fourth, and said fifth and sixth capacitor connection terminals, respectively, and wherein said first, second, and third charge reservoir capacitors are the only charge reservoir capacitors required for transferring charge between said input terminal to said first and second output terminals.

22. An charge pump circuit provided as an element of an integrated circuit having a plurality of terminals, said charge pump circuit comprising:
   a) first means for selectively coupling first and second capacitor connection terminals to an input terminal;
   b) second means for selectively coupling said second capacitor connection terminals to a reference terminal;
   c) third means for selectively coupling said first capacitor connection terminal to a first output terminal;
   d) fourth means for selectively coupling a third capacitor connection terminal to said first output terminal and said reference terminal;
   e) fifth means for selectively coupling a fourth capacitor connection terminal to said reference terminal or a second output terminal;
   f) sixth means for selectively coupling a fifth capacitor connection terminal to said reference terminal and a sixth capacitor connection terminal to a second output terminal; and
   g) control means for controlling said first through sixth means to provide for the transfer of charge from said input terminal to said first and second output terminals.

* * * * *